(12) United States Patent
Levy et al.

(10) Patent No.: US 10,684,960 B2
(45) Date of Patent: Jun. 16, 2020

(54) MANAGING CACHE MEMORY IN A NETWORK ELEMENT BASED ON COSTS ASSOCIATED WITH FETCHING MISSING CACHE ENTRIES

(71) Applicant: Mellanox Technologies TLV Ltd., Raanana (IL)

(72) Inventors: Gil Levy, Hod Hasharon (IL); Fima Kravchik, Holon (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 234 days.

(21) Appl. No.: 15/830,021

(22) Filed: Dec. 4, 2017

(65) Prior Publication Data

US 2019/0171582 A1    Jun. 6, 2019

(51) Int. Cl.
| G06F 12/00 | (2006.01) |
| G06F 13/00 | (2006.01) |
| G06F 13/28 | (2006.01) |
| G06F 12/126 | (2016.01) |
| G06F 16/2455 | (2019.01) |

(52) U.S. Cl.
CPC ...... *G06F 12/126* (2013.01); *G06F 16/24562* (2019.01); *G06F 2212/1016* (2013.01); *G06F 2212/1044* (2013.01); *G06F 2212/154* (2013.01)

(58) Field of Classification Search
CPC ............ G06F 12/126; G06F 16/24562; G06F 2212/154; G06F 2212/1044
USPC ......................................................... 711/133
See application file for complete search history.

(56) References Cited

U.S. PATENT DOCUMENTS

| 6,754,662 | B1 | 6/2004 | Li et al. |
| 9,160,650 | B2 | 10/2015 | Zhang et al. |
| 9,596,181 | B1 | 3/2017 | Goel et al. |
| 2001/0028651 | A1 | 10/2001 | Murase |
| 2004/0085953 | A1 | 5/2004 | Davis |

(Continued)

OTHER PUBLICATIONS

Gupta et al., "Routing Lookups in Hardware at Memory Access Speeds", Proceedings of the Conference on Computer Communications (IEEE INFOCOMM), vol. 3, pp. 1241-1248, San Francisco, USA, Mar./Apr. 1998.

(Continued)

*Primary Examiner* — Edward J Dudek, Jr.
*Assistant Examiner* — Sidney Li
(74) *Attorney, Agent, or Firm* — Kligler & Associates Patent Attorneys Ltd

(57) ABSTRACT

A network element includes a data structure, a cache memory and circuitry. The data structure is configured to store multiple rules specifying processing of packets received from a communication network. The cache memory is configured to cache multiple rules including a subset of the rules stored in the data structure. Each rule that is cached in the cache memory has a respective cost value corresponding to a cost of retrieving the rule from the data structure. The circuitry is configured to receive one or more packets from the communication network, to process the received packets in accordance with one or more of the rules, by retrieving the rules from the cache memory when available, or from the data structure otherwise, to select a rule to be evicted from the cache memory, based on one or more respective cost values of the rules currently cached, and to evict the selected rule.

18 Claims, 3 Drawing Sheets

(56) References Cited

U.S. PATENT DOCUMENTS

| | | | |
|---|---|---|---|
| 2005/0038907 A1 | 2/2005 | Roeder et al. | |
| 2005/0091443 A1 | 4/2005 | Hershkovich et al. | |
| 2008/0212586 A1* | 9/2008 | Wang | H04L 45/00 370/392 |
| 2009/0077076 A1 | 3/2009 | Berger et al. | |
| 2010/0040066 A1 | 2/2010 | Hao et al. | |
| 2010/0080223 A1 | 4/2010 | Wong et al. | |
| 2012/0246411 A1* | 9/2012 | Birka | G06F 12/121 711/133 |
| 2013/0297879 A1* | 11/2013 | Abali | G06F 12/0864 711/128 |
| 2015/0039836 A1* | 2/2015 | Wang | G06F 12/0804 711/136 |
| 2015/0098470 A1 | 4/2015 | Sun et al. | |
| 2015/0131665 A1 | 5/2015 | Griswold | |
| 2016/0335296 A1 | 11/2016 | Sathe et al. | |
| 2017/0366459 A1 | 12/2017 | Kfir et al. | |
| 2017/0366502 A1 | 12/2017 | Kravchik et al. | |

OTHER PUBLICATIONS

Kasnavi et al., "A cache-based internet protocol address lookup architecture", Computer Networks, vol. 52, pp. 303-326, year 2008.

Kim et al, "Revisiting Route Caching: TheWorld Should Be Flat", Proceedings of the 10th International Conference on Passive and Active Network Measurement (PAM), 10 pages, Seoul, Korea, Apr. 1-3, 2009.

Kohler et al., "Observed Structure of Addresses in IP Traffic", IEEE/ACM Transactions on Networking, vol. 14, No. 6, pp. 1207-1218, Dec. 2006.

Liu et al., "Efficient FIB Caching using Minimal Non-overlapping Prefixes", ACM SIGCOMM Computer Communication Review, vol. 43, No. 1, pp. 15-21, Jan. 2013.

Sarrar et al., "Leveraging Zipf's Law for Traffic Offloading", ACM SIGCOMM Computer Communication Review, vol. 42, No. 1, pp. 17-22, Jan. 2012.

WAND Network Research Group, 7 pages, Apr. 22, 2010 (downloaded from http://wand.net.nz/wits/catalogue.php).

The CAIDA Anonymized Internet Traces 2014 Dataset, 2 pages, 2014 https://www.caida.org/data/passive/passive_2014_dataset.xml.

Waldvogel et al., "Scalable High-Speed Prefix Matching", Proceedings of the ACM SIGCOMM 97 Conference on applications, technologies, architectures, and protocols for computer communication, Cannes, France, pp. 25-36, Sep. 15-18, 1997.

Levy et al., U.S. Appl. No. 15/469,530, filed Mar. 26, 2017.

U.S. Appl. No. 15/186,562 Office Action dated Jan. 4, 2018.

U.S. Appl. No. 16/039,372 office action dated Jul. 23, 2019.

* cited by examiner

MANAGING CACHE MEMORY IN A NETWORK ELEMENT BASED ON COSTS ASSOCIATED WITH FETCHING MISSING CACHE ENTRIES

TECHNICAL FIELD

Embodiments described herein relate generally to network communication, and particularly to methods and systems for managing a cache memory in a network element based on costs associated with fetching missing cache entries.

BACKGROUND

In various applications, network elements such as switches and routers are required to handle network traffic at high speeds. A network element may process packets for the purpose of packet forwarding and classification.

Methods for packet processing in a network element are known in the art. For example, U.S. Pat. No. 6,754,662, describes a packet classification architecture that includes a cached hash table that stores a subset of classification identifiers for a plurality of data flows. A forwarding engine coupled to the cache receives packets and first attempts to classify the packet by generating a hash key based on header information from the packet, and using the hash key to lookup a corresponding entry in the hash table.

SUMMARY

An embodiment that is described herein provides a network element that includes a data structure, a cache memory and circuitry. The data structure is configured to store multiple rules specifying processing of packets received from a communication network. The cache memory is configured to cache multiple rules including a subset of the rules stored in the data structure. Each rule that is cached in the cache memory has a respective cost value corresponding to a cost of retrieving the rule from the data structure. The circuitry is configured to receive one or more packets from the communication network, to process the received packets in accordance with one or more of the rules, by retrieving the rules from the cache memory when available, or from the data structure otherwise, to select a rule to be evicted from the cache memory based on one or more respective cost values of the rules currently cached, and to evict the selected rule.

In some embodiments, the circuitry is configured to retrieve a rule from the data structure, to cache the retrieved rule in the cache memory, and to store a respective cost value in association with the rule cached. In other embodiments, the cost value includes a function of an actual number of memory-access operations required to perform a lookup operation of the respective rule in the data structure.

In an embodiment, the cost value includes two or more cost levels corresponding to a quantized version of the actual number of memory-access operations. In another embodiment, the cost value of a given rule includes a latency incurred in retrieving the given rule from the data structure. In yet another embodiment, the circuitry is configured to select from the cache memory multiple candidate rules for which the respective cost values fall within a predefined range of cost values, and to select the rule to be evicted from among the candidate rules.

In some embodiments, the circuitry is configured to select from the cache memory multiple candidate rules, independently of the cost values, and to select the rule to be evicted, from among the candidate rules, based on the respective cost values of the candidate rules. In other embodiments, the circuitry is configured to select the rule to be evicted randomly, with a predefined probability.

In an embodiment, the circuitry is configured to assign to the rules currently cached respective eviction attributes, to select from the cache memory multiple candidate rules based on the assigned eviction attributes, to calculate for the candidate rules respective combined costs as a function of the respective cost values and eviction attributes, and to select the rule to be evicted based on the combined costs. In another embodiment, the circuitry is configured to estimate the cost of retrieving a given rule from the data structure, and to determine the respective cost value based on the estimated cost.

There is additionally provided, in accordance with an embodiment that is described herein, a method, including, in a network element, storing in a data structure multiple rules specifying processing of packets received from a communication network. Multiple rules including a subset of the rules stored in the data structure are cached in a cache memory. Each rule that is cached in the cache memory has a respective cost value corresponding to a cost of retrieving the rule from the data structure. One or more packets are received from the communication network, and the received packets are processed in accordance with one or more of the rules, by retrieving the rules from the cache memory when available, or from the data structure otherwise. A rule to be evicted is selected from the cache memory based on one or more respective cost values of the rules currently cached, and the selected rule is evicted.

These and other embodiments will be more fully understood from the following detailed description of the embodiments thereof, taken together with the drawings in which:

DETAILED DESCRIPTION OF EMBODIMENTS

Overview

Figure 1:
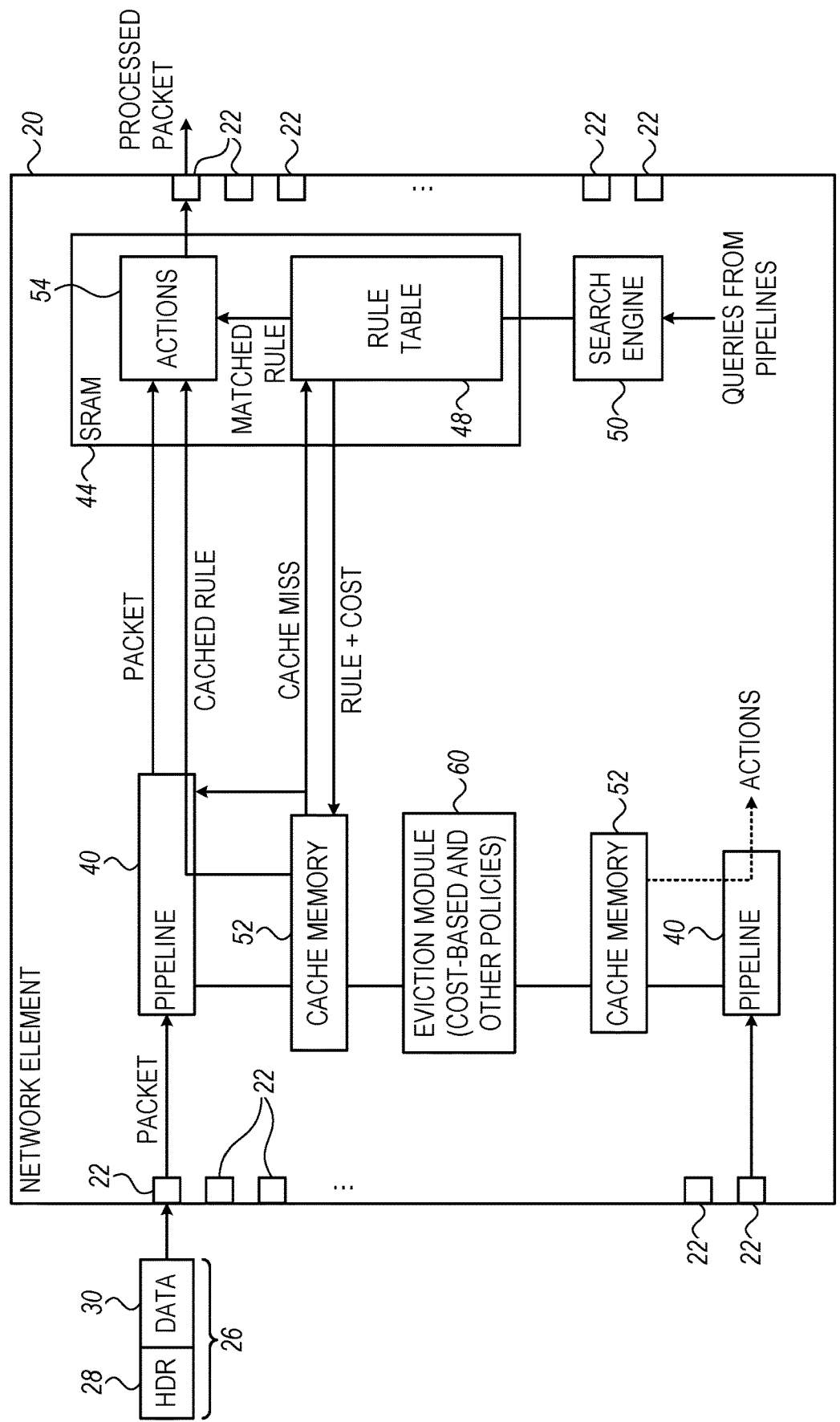
FIG. 1 is a block diagram that schematically illustrates a network element that employs a cost-based eviction policy from a cache memory, in accordance with an embodiment that is described herein.

Packets traversing a path in a communication network may undergo various kinds of processing by network elements along the path. Such processing includes, for example, packet forwarding and packet classification.

Embodiments that are described herein provide methods and systems for managing packet-processing rules in a cache memory of a network element. In particular, the disclosed embodiments provide improved methods for evicting rules from the cache memory. The disclosed techniques are applicable to various types of network elements such as switches, routers or bridges.

Packets received in a network element may belong to a large number of flows that may require different processing.

A flow comprises a sequence of packets sent over the network from a source node to a destination node. In some embodiments, the network element comprises a memory for storing predefined packet-processing rules using a suitable data structure, e.g., a database or a lookup table. A single lookup operation in the data structure typically requires multiple access operations to the memory, which delays packet processing and therefore limits the throughput that the network element can handle. This in turn degrades the overall network performance.

In some embodiments, to accommodate high bandwidth and speed demands, the network element comprises a fast-access cache memory that caches a subset of the rules in the data structure. A packet received in the network element is handled by a pipeline, which first searches the cache memory to find a rule for processing the packet. If no suitable rule is found in the cache memory, the pipeline redirects the rule search to the data structure. The pipeline applies packet processing to the packet based on the rule found in the cache memory or in the data structure.

Searching the cache memory and the data structure is based on respective keys, which the pipeline usually derives from certain fields in the packet header. The key may be derived, for example, from a MAC address or IP address, in a network bridge or router, respectively.

Typically, the cache memory has room for only a portion of the rules in the data structure. Efficient management of the cache should therefore aim to update the cached rules dynamically in accordance with time-varying traffic.

Managing the cache memory mainly involves (i) fetching for caching rules that are unavailable in the cache but are required for processing incoming packets and (ii) evicting rules from the cache memory to make room for caching recently fetched rules. In some embodiments, the rules to be cached are typically fetched from the data structure. Methods for efficient cache eviction will be described in detail below.

As noted above, a search operation in the data structure involves multiple memory-access operations, depending on the underlying search method used and the key value. Since an evicted rule may need to be cached again at a later time, evicting rules that are fast to search in the data structure is generally advantageous.

In some embodiments, the network element comprises an eviction module that applies a cost-based eviction policy, according to which each rule in the cache memory is assigned a respective cost value corresponding to the cost of fetching the rule from the data structure. In addition, the eviction module selects rules to be evicted from the cache memory based on the respective cost values of the rules currently cached. For example, rules having low cost values are evicted with high priority.

The cost values may be assigned to the cached rules in any suitable manner. For example, the cost value relates to the number of memory-access operations required, or the latency it takes, to search the respective rule in the data structure.

In the description that follows, the terms "searching a rule" and "retrieving a rule" (from the data structure) are used interchangeably.

In some embodiments, the eviction module selects for eviction the rule having the lowest cost value among the currently cached rules. When multiple rules in the cache memory share the lowest cost value, the eviction module randomly selects for eviction one (or more) of these rules.

In some embodiments, to avoid retaining in the cache memory rules having high cost values even when these rules are rarely used, the eviction module occasionally selects the rule for eviction in random. For example, the eviction module applies cost-based eviction with predefined probability $0<P<1$, e.g., $P=90\%$, and randomly selects a rule for eviction with probability $(1-P)$, e.g., 10%.

In some embodiments, in addition to the cost-based eviction policy, the eviction module supports one or more eviction policies that are independent of the cost values assigned to the cached rules. For example, in using a First-In First-Out (FIFO) approach, the first cached item is evicted first regardless of its actual usage. As another example, in Least Recently Used (LRU) eviction, the least recently used items are evicted first.

In some embodiments, the eviction module combines the cost-based eviction policy with another eviction policy that does not depend on the cost values. For example, the eviction module first selects from the cache memory multiple candidate rules, e.g., using a LRU method, and then selects a rule to be evicted by selecting a candidate rule having the lowest cost value. This can be viewed as applying a tie-breaking selection among the multiple candidate rules selected using a LRU approach.

In some embodiments the eviction module assigns to the rules currently cached respective eviction attributes. For example, in using LRU, the eviction attribute may comprise the time period during which the respective cached rule was recently unused. The eviction module selects from the cache memory multiple candidate rules based on the assigned eviction attributes, calculates for the candidate rules respective combined costs as a function of the respective cost values and eviction attributes, and selects the rule to be evicted based on the combined costs. The combined cost may comprise, for example, a weighted sum between the cost value and eviction attribute of the respective rule.

In the disclosed techniques, evicting rules from a cache memory is based on costs of fetching the rules from a dedicated data structure in memory. As such, rules whose fetching costs are low are evicted from the cache memory with higher priority. By using the disclosed techniques, the average packet processing delay by the network element decreases, and the overall network performance improves.

System Description

FIG. 1 is a block diagram that schematically illustrates a network element (20) that employs a cost-based eviction policy from a cache memory, in accordance with an embodiment that is described herein. Typically, network element 20 is configured as a network switch or router, for example, with multiple ports 22 connected to a packet communication network.

Network element 20 applies to packets 26 processing rules for various purposes such as packet classification, and forwarding between ports 22, as well as performing other actions, such as encapsulation and de-capsulation, security filtering, and/or quality-of-service functions. The circuitry needed for carrying out such forwarding and other functions will be apparent to those skilled in the art and is omitted from the figures for the sake of simplicity.

Network element 20 receives packets 26 containing a header 28 and payload data 30. A processing pipeline 40 receives from the network packets 26 via one or more ports 22, and generates a key from each packet 26, typically (although not necessarily) based on the contents of certain fields of header 28. For example, the key may comprise the source and destination addresses and ports and a protocol identifier. Network element 20 typically comprises multiple pipelines 40, each pipeline receiving packets from a respective group of ports 22.

The network element comprises a memory 44, which stores a plurality of predefined packet-processing rules, to be applied to the received packets by the pipelines. The packet-processing rules are also referred to simply as "processing rules" or just "rules" for brevity. Memory may be implemented using any suitable storage technology. In some embodiments, memory 44 comprises a Static Random-Access Memory (SRAM). In some embodiments, memory 44 is implemented within the same die as the circuitry implementing the pipeline(s), in which case the die size limits the amount of storage space of memory 44. Alternatively, memory 44 is implemented separately from the pipeline(s) die, e.g., using Dynamic Random-Access Memory (DRAM) or other suitable storage technology.

The rules stored in memory 44 are organized in a data structure 48, denoted a "rule table" in the figure. In the description that follows the terms "data structure" and "rule table" are used interchangeably. In some embodiments, the pipeline initiates a search in data structure 48 using a suitable search engine 50. The search engine may comprise a hardware accelerator for performing efficient lookup operations in data structure 48.

Searching the data structure can be carried out in various ways. In an example embodiment, in a router, a Long Prefix Match (LPM) method is used for searching an IP address in a data structure comprising a forwarding table. In another embodiment, dedicated lookup methods are used for searching in a data structure organized as a Content-Addressable Memory (CAM) or Ternary-CAM (TCAM) for packet classification.

In some embodiments, searching a rule in the data structure requires one or more access operations to memory 44. The number of memory-access operations depends on both the underlying searching method and on the key value. For a given searching method, the number of memory-access operations 'n' required for finding a matching rule (or deciding that no rule in the data structure matches the key) varies between 1 and N, wherein N depends on the searching method and n depends on the key value. For example, when searching IP addresses in an IP table (i.e., a routing table of IP addresses), the number of memory accesses to the IP table in a search operation depends on (i) the underlying LPM variant used, (ii) the specific IP address to be searched, and (iii) the content of the IP table. N may be a number smaller than 10, e.g., N=5.

In some embodiments, the rules stored in memory 44 (i.e., in the data structure) are associated with respective fetching costs. The fetching costs are defined, for example, in terms of the number of memory-access operations required to perform a search operation in the data structure. For example, the fetching cost may be defined as the number n of memory-access operations. As another example, the fetching cost is defined in terms of the time latency it takes to perform a search operation in the data structure. Alternatively or additionally, fetching costs of other suitable types can also be used. Eviction policies that take into consideration the fetching costs will be described in detail below.

Note that the cost value assigned to a given rule depends on attributes related to the lookup operation applied in searching the given rule from the data structure, and not to the matched rule itself. Such attributes comprise, for example, the number of memory access operations and latency in searching the given rule in the data structure.

Network element 20 further comprises one or more cache memories 52 that each stores a subset of the rules in data structure 48. In the present example, each pipeline 40 is served by a respective cache memory 52. Alternatively, a single cache memory may serve multiple pipelines. Cache memory 52 may comprise a single caching level or a caching hierarchy of two or more caching levels.

In some embodiments, a processing rule (in the cache memory or in the data structure) specifies the processing to be applied to the packet as part of the rule itself. Alternatively, the rule specifies the packet processing by pointing to an address in memory 44, in which the relevant processing information is stored, as will be described below. Searching in cache memory 52 is typically much faster than searching in data structure 48, and therefore has higher priority.

The cache memory comprises multiple cache entries that are accessible using a suitable key. In the context of the present disclosure we assume that each rule in the cache memory is accessible using a respective key value. In practice various suitable caching and rule accessing configurations can be used, such as, for example, a single rule may be stored in a single cache entry, or across two or more cache entries.

In addition to data structure 48, memory 44 contains a list of actions 54 to be performed when a key is found to match one of the rules in in cache memory 52 or in data structure 48. For this purpose, each rule in the data structure and in the cache memory typically contains a pointer to the particular action that pipeline 40 is to apply to packet 26 in case of a match.

In some embodiments, searching both the cache memory and the data structure is based on a common key. Alternatively, different keys are derived from the packet header and used for searching the cache memory and the data structure, respectively.

If a matching rule is found in the cache memory or in the data structure, pipeline 40 processes the packet as specified by the rule, e.g., by applying to the packet a respective action in list of actions 54.

In some embodiments, when the rule for processing a packet is missing from the cache memory but is found in the data structure, the rule is cached in the cache memory, for future use. In some cases, e.g., when the cache memory is fully utilized (or close to be fully utilized), one or more rules should be evicted from the cache memory, to make room for the rule (or rules) fetched from the data structure.

Network element 20 comprises an eviction module 60, which employs one or more eviction policies. Each eviction policy specifies a method for selecting one or more of the cached rules to be evicted. The eviction module supports a cost-based eviction policy in which selecting rules for eviction depends on the costs of fetching the rules from the data structure. The eviction module may additionally support one or more eviction policies that are independent of the costs of fetching rules from the data structure. Embodiments implementing example eviction strategies will be described in detail below.

The network element configuration shown in FIG. 1 is an example configuration, which is chosen purely for the sake of conceptual clarity. In alternative embodiments, any other suitable network element configuration can be used. For example, although the embodiments described herein refer mainly to network elements in general, the disclosed techniques can be implemented in various types of network elements such as network switches, routers and bridges.

Certain elements of network element 20 may be implemented using hardware/firmware, such as using one or more Application-Specific Integrated Circuits (ASICs) or Field-Programmable Gate Arrays (FPGAs). Alternatively, some elements of network element 20 may be implemented in software or using a combination of hardware/firmware and software elements. Memory 44 may be implemented using any suitable memory, such as Random Access Memory (RAM) or Static RAM (SRAM).

In some embodiments, certain network element functions, such as certain functions of pipelines 40, may be implemented using a processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

As noted above, the network element comprises memory 44, cache memories 52 and other elements. In the description that follows and in the claims, the term "circuitry" refers to all the elements of the network element excluding memory 44 and cache memories 52. In the example of FIG. 1, the circuitry comprises ports 22, pipelines 40, eviction module 60 and search engine 50 of network element 20.

Although in the described embodiments the functionality of the circuitry is portioned among ports 22, pipelines 40, eviction module 60 and search engine 50 of network element 20, this partition is given by way of example is not mandatory. In alternative embodiments, the functionality of the circuitry can be partitioned among the elements above and/or other elements (not shown) in any suitable manner.

Packet Processing Using Cached Rules

Figure 2:
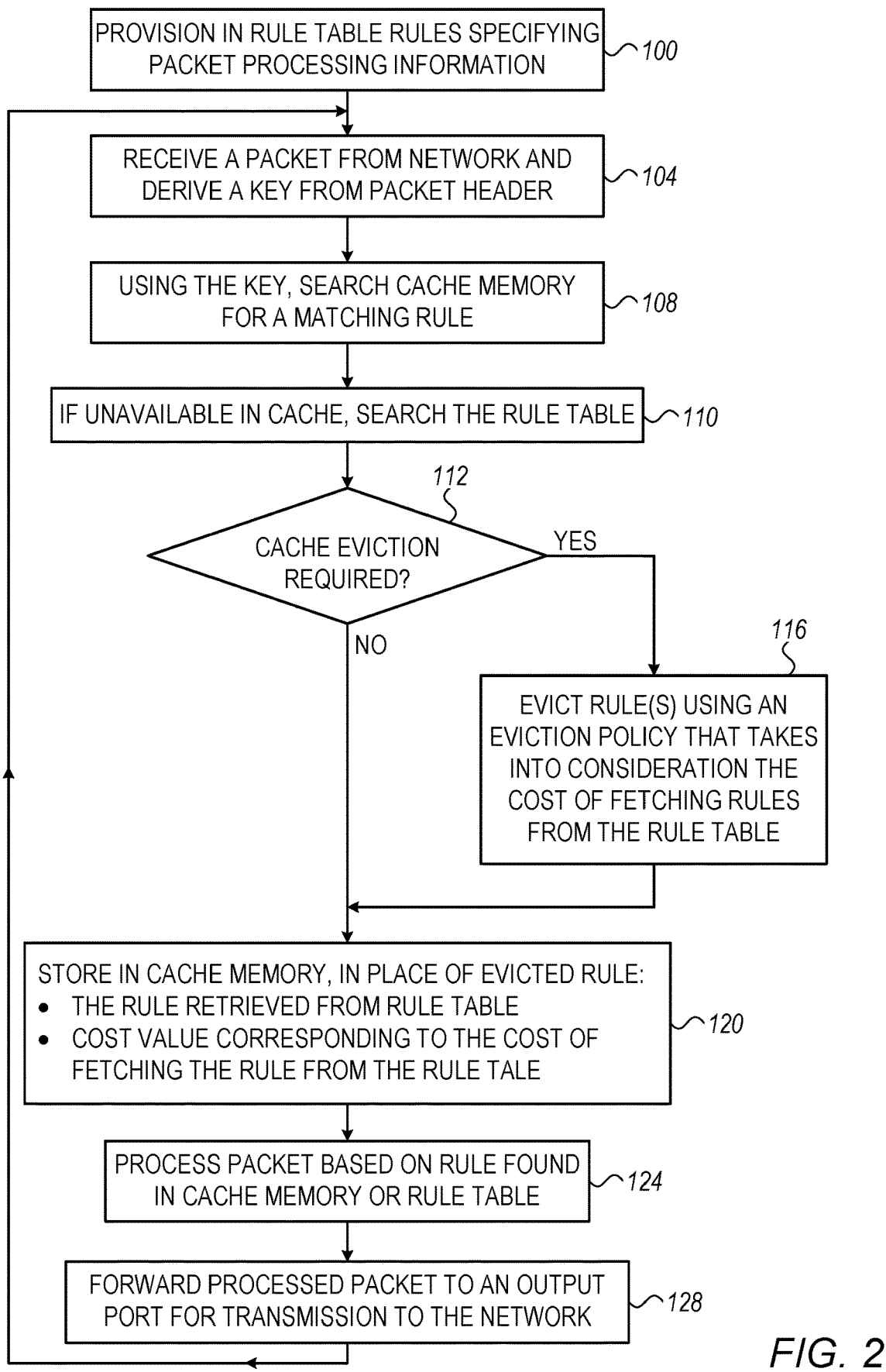
FIG. 2 is a flow chart that schematically illustrates a method for packet processing using cached processing rules, in according with an embodiment that is described herein.

FIG. 2 is a flow chart that schematically illustrates a method for packet processing using cached processing rules, in according with an embodiment that is described herein. The method will be described as being executed by various elements of network element 20 of FIG. 1.

The method begins with the network element provisions multiple processing rules into rule table 48, at a provisioning step 100. Each processing rule specifies processing to be applied to certain packets. In some embodiments, the rule table stores in association with each rule a respective cost value indicative of the fetching cost of retrieving the rule from the rule table.

At a reception step 104, the network element receives a packet from the network via one of ports 22, and forwards the received packet to pipeline 40, which derives, from one or more fields in the packet header, a respective key. At a rule searching step 108, the pipeline first uses the key to search for a matching rule in cache memory 52. If none of the currently cached rules matches the key, i.e., a cache-miss event occurs, the pipeline initiates a search operation in rule table 48, at a rule table search step 110. In searching the rule table, the pipeline uses the same key used to search the cache memory, or another key derived from the packet header. In some embodiments, the outcome at step 110 comprises both the missing rule found in the rule table and the cost associated with searching this missing rule in the rule table.

At an eviction checking step 112, eviction module 60 checks whether or not eviction from the cache memory is required. For example, the eviction module checks whether the cache memory has an available entry for storing the retrieved rule. Alternatively, the eviction module checks whether eviction is required or not based on the occupancy level of the cache memory relative to a predefined occupancy threshold. For example, the eviction module may evict one or more rules so that at least one cache entry is available at any time.

If at step 112 the eviction module decides that eviction is required, the eviction module proceeds to an eviction step 116, to evict one or more rules from the cache memory. The eviction method applied at step 116 takes into consideration the costs of fetching rules from the rule table, based on cost values assigned to the cached rules. The cost values are typically pre-cached in cache memory 52 is association with the respective rules.

At step 116, the eviction module may actually evict a rule by marking the respective cache entry as an available cache entry. Alternatively or additionally, the eviction module provides the address in the cache memory of the evicted rule. Further alternatively, any other suitable eviction method can also be used.

Following step 116, or when at step 112 no eviction is required, the method proceeds to a rule caching step 120. At step 120, the eviction module (or pipeline) assigns to the rule retrieved from the rule table a respective cost value and caches the retrieved rule and the respective cost value in the cache memory, in place of one of the rules that were evicted at step 116. In some embodiments, the cost value is retrieved from the rule table in addition to the respective rule.

In some embodiments, the cost value comprises a quantized version of some fetching cost. For example, the fetching cost may comprise the number 'n' of memory-access operations, wherein $1 \leq n \leq N$, and the respective cost value equals n or a non-decreasing function of n. Alternatively, the respective cost value is given by a quantization function QUANTIZE(n,N,L) that quantizes n into a predefined number L of levels. As an example, Let N=5, L=2, and two subgroups of the range of numbers 1 . . . 5 are defined as {1, 2} and {3, 4, 5}. The respective cost values may be defined as: $cost[n \in \{1, 2\}]=1$ and $cost[n \in \{3, 4, 5\}]=2$. Alternatively, other quantization functions using other values of N, L, and quantization subgroups can also be used.

In some embodiments, instead of (or in addition to) retrieving the cost value from the rule table, the eviction module (or the pipeline) estimates a fetching cost of retrieving the rule from the rule table, and assigns to the rule a respective cost value accordingly. For example, the eviction module estimates the latency in retrieving the rule from the rule table, e.g., by measuring the latency of retrieving the rule multiple search operations of the same rule, and assigns the estimated latency (or some function of the estimated latency) as the cost value for the rule. In alternative embodiments, both the rule and the respective fetching latency from the rule table are retrieved from the rule table as a search outcome.

At a processing step 124, the pipeline processes the packet using the rule that was found in the cache memory or in the rule table. In some embodiments, the pipeline applies to the packet an action from list of actions 54, using a pointer in the rule. When at step 108 no rule for processing the packet is found in either the cache memory or rule table, the pipeline applies to the packet some default processing (not shown), e.g., the pipeline discards the packet.

At a forwarding step 128, the network element forwards the processed packet to a suitable port 22 for transmission to the network. The port via which to forward the packet may be determined as part of applying the rule to the packet. Following step 128 the method loops back to step 104 to receive subsequent packets for processing.

Methods for Cost-Based Eviction

Now we describe several embodiments in which the eviction module applies eviction policies that take into consideration the cost of fetching rules from the rule table.

In some embodiments, eviction module 60 evicts from cache memory 52 one or more rules using a cost-based eviction policy. For example, the eviction module selects for eviction one or more of the currently cached rules having the lowest respective cost values.

In some embodiments, two or more of the cached rules share the same lowest cost value. In such embodiments, the eviction module selects the rule to evict from among the rules sharing the lowest cost value, e.g., in random, or using any other selection method. This approach is similarly applicable in evicting multiple rules.

In an embodiment, the eviction module first selects from the cache memory multiple candidate rules for which the respective cost values fall within a predefined range of cost values, e.g., a range of successive integers {1 ... n'}, and to select the rule to be evicted from among the candidate rules.

In some embodiments, the eviction module supports, in addition to the cost-based eviction policy, one or more eviction policies that do not depend on the cost values assigned to the cached rules. For example, the eviction module supports an eviction policy related to the usage rate of the cached rules. For example, in a Least Recently Used (LRU) eviction policy, the least recently used rule(s) are evicted first. In some embodiments, the eviction module selects rules for eviction by combining a cost-based eviction policy and one or more eviction policies that do not depend on the cost values. Example combined policies will be described in detail below.

In some embodiments, the eviction policy that does not depend on the fetching costs selects rules for eviction based on some eviction criterion applied to respective eviction attributes of the cached rules. In LRU, for example, the eviction attribute may comprise the time period during which the rule has been recently unused, and the eviction criterion selects to evict the rule whose eviction attribute has the longest period. In such embodiments, the eviction module combines the cost-based and other policies by calculating a combined cost as a function of the cost value of the rule and its eviction attribute as given by, CombinedCost=$f$(CostValue,EvictionAattribute)   Equation 1:

The eviction module selects the rule to be evicted for which CombinedCost is minimal over the cached rules or over a subset of the cached rules.

In an embodiment the combined cost is given by the function:

CombinedCost=$W1$·CostValue+$W2$·EvictionAattribute   Equation 2:

In Equation 2, W1 and W2 are weighting parameters assigned to CostValue and EvictionAttribute, respectively. For example the weights may be assigned as W1=A and W2=(1−A), wherein 0<A<1 is a predefined parameter.

Evicting rules based on their respective cost values may result in retaining, in the cache memory, rules having respective high cost values, even if these rules are not used for long periods of time. This may occur, for example, when the network traffic during some time period includes only a few (or none) packets whose processing is based on these rules.

In some embodiments, to avoid performance degradation, the eviction module occasionally evicts from the cache memory one or more rules, e.g., in random. In an embodiment, the eviction module uses a predefined parameter 0.5<P<1, e.g., P=0.9. The eviction module applies a cost-based eviction method with probability P, e.g., 90%, and a random rule eviction method with probability (1−p), e.g. 10%.

Figure 3:
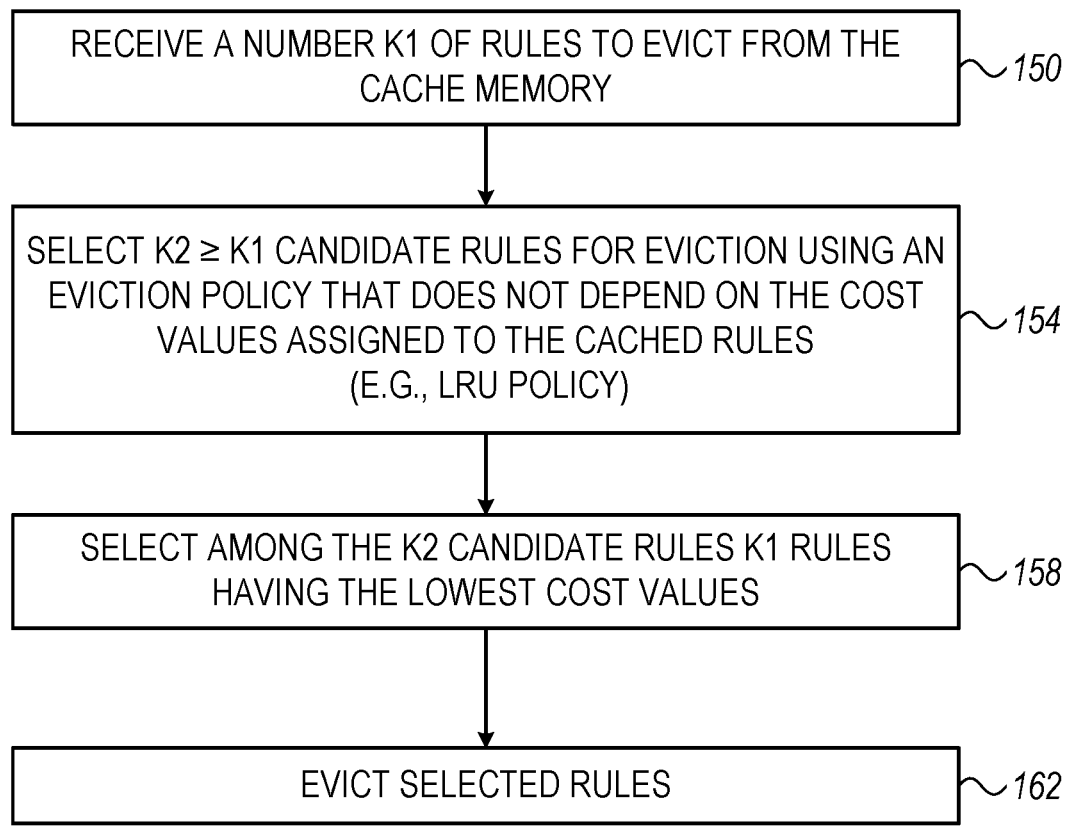
FIG. 3 is a flow chart that schematically illustrates a method for cache memory eviction, in accordance with an embodiment that is described herein.

FIG. 3 is a flow chart that schematically illustrates a method for cache memory eviction, in accordance with an embodiment that is described herein. The method of FIG. 3 will be described as being executed by eviction module 60 of network element 20. The method of FIG. 3 can be used, for example, in implementing step 116 of FIG. 2.

In the present example, we assume that a cost value is cached in the cache memory for each cached rule. The cost value is indicative of the fetching cost of fetching the respective rule from the rule table.

The method begins with eviction module 60 receiving a number K1 of rules to be evicted from the cache memory, at an eviction request step 150. We generally assume that K1 is smaller than the number of rules currently cached. Otherwise, the eviction module evicts the entire cache memory and the method terminates (not shown). In a typical scenario K1=1, e.g., need to evict a single rule from the cache memory.

At a candidate selection step 154, the eviction module selects from the cache memory a number K2 of candidate rules, wherein K1≤K2. The selection at step 154 is carried out using any suitable method, independently of the cost values assigned to the cached rules. For example, at step 154 the eviction module selects the K2 candidate rules using a LRU eviction policy.

At an eviction selection step 158, the eviction module selects K1 rules for eviction from among the previously selected K2 candidate rules. In an embodiment, at step 158, the eviction module selects the K1 rules having the lowest cost values. At an eviction step 162, the eviction module evicts from the cache memory the K1 rules selected at step 158. Following step 162 the method terminates.

An Example Demonstrating the Gain Achieved by Using a Cost-Based Eviction Policy Consider a network traffic model for which the number of memory-access operations per key in searching the rule table is distributed uniformly in the range 1-5. Further assume assigning cost values to the cached rules in accordance with the following table:

TABLE 1

Cost values assignment table

| Number of memory accesses 'n' per a search operation in rule table | | Cost value assigned to cached rules |
|---|---|---|
| 1 | AVG = 1.5 | Cost value = 1 |
| 2 | | |
| 3 | AVG = 2 | Cost value = 2 |
| 4 | | |
| 5 | | |

We further assume in this example that per each hardware clock cycle, a packet arrives at an input port of the network element. In addition, the SRAM in which the rule table is stored supports one access operation to the memory per clock cycle.

Let the performance measure be defined as the inverse of the average number of access operations in the rule table per a rule search. Next we compare between the performance measures with and without using a cost-based eviction policy.

Consider a reference eviction method that does not take into consideration the cost values of the cached rules. Using the reference method, the average number of memory-access operations per search in the rule table is given by $3=(1+2+3+4+5)/5$. If we further assume a cache-hit ratio of 66.7% (or higher), at least one out of three searches in the cache memory (on average) is redirected to search in the rule table. The overall performance is therefore given by $1/[0\cdot(\frac{2}{3})+3\cdot(\frac{1}{3})]=100\%$. Note that in the reference method, if the cache-hit ratio reduces from 66.7% to 50%, the performance reduces accordingly from 100% to $1/[0\cdot(\frac{1}{2})+3\cdot(\frac{1}{2})]\approx67\%$.

Next consider a cost-based eviction policy for which 80% of the cached rules are assigned a cost value 1, and the remaining 20% of the cached rules are assigned a cost value 2. This means that the average number of memory-access operations in the rule table, is now given by $(1+2)/2=1.5$ for cost value 1, and by $(3+4+5)/3=4$ for cost value 2. The overall average number of memory-access operations in the rule table is now given by $2=(0.8\cdot1.5+0.2\cdot4)$. Since half of the searches in the cache memory (on average) are redirected to the rule table, the performance when using this cost-based eviction method is given by $1/[0\cdot(\frac{1}{2})+(\frac{1}{2})\cdot2]=100\%$.

Table 2 summarizes the example conclusions. As can be seen from the table, the performance reduction from 100% to about 67% due to the reduction in cache-hit ratio using the reference eviction method can be regained to 100% using a cost-based eviction policy.

TABLE 2 performance with/without cost-based eviction

|  | Non cost-based eviction policy |  | Cost-based eviction policy |
| --- | --- | --- | --- |
| Cache-hit ratio | 67% | 50% | 50% |
| Performance | 100% | 67% | 100% |

The embodiments described above are given by way of example, and other suitable embodiments can also be used. For example, in the embodiments described above we mainly assume that cache eviction is triggered in response to retrieving a rule from the rule table, e.g., when a cache-miss event occurs. In other embodiments, however, cache eviction may be initiated cyclically, regardless of the cache occupancy level and whether or not a rule has been retrieved from the rule table.

As another example, although in the embodiments described above the cost values are cached together with the rules in the cache memory, in other embodiments, the rules and respective cost values can be cached in separate cache or other memories.

Although in the embodiments above, the lowest cost values correspond to rules that are faster to retrieve from the rule table, the cost values can alternatively be defined in an opposite manner, so that rules having the highest cost values will be evicted first.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   a data structure, configured to store multiple rules specifying processing of packets received from a communication network;
   a cache memory, configured to cache multiple rules comprising a subset of the rules stored in the data structure, wherein each rule that is cached in the cache memory has a respective cost value that is a function of an actual number of memory-access operations required to perform a lookup operation of the respective rule in the data structure; and
   circuitry, configured to:
      receive one or more packets from the communication network;
      process the received packets in accordance with one or more of the rules, by retrieving the rules from the cache memory when available, or by performing a lookup operation in the data structure otherwise;
      select a rule to be evicted from the cache memory, based on one or more respective cost values of the rules currently cached; and
      evict the selected rule.

2. The network element according to claim 1, wherein the circuitry is configured to retrieve a rule from the data structure, to cache the retrieved rule in the cache memory, and to store a respective cost value in association with the rule cached.

3. The network element according to claim 1, wherein the cost value comprises two or more cost levels corresponding to a quantized version of the actual number of memory-access operations.

4. The network element according to claim 1, wherein the cost value of a given rule comprises a latency incurred in retrieving the given rule from the data structure.

5. The network element according to claim 1, wherein the circuitry is configured to select from the cache memory multiple candidate rules for which the respective cost values fall within a predefined range of cost values, and to select the rule to be evicted from among the candidate rules.

6. The network element according to claim 1, wherein the circuitry is configured to select from the cache memory multiple candidate rules, independently of the cost values, and to select the rule to be evicted, from among the candidate rules, based on the respective cost values of the candidate rules.

7. The network element according to claim 1, wherein the circuitry is configured to select the rule to be evicted randomly, with a predefined probability.

8. The network element according to claim 1, wherein the circuitry is configured to assign to the rules currently cached respective eviction attributes, to select from the cache memory multiple candidate rules based on the assigned eviction attributes, to calculate for the candidate rules respective combined costs as a function of the respective cost values and eviction attributes, and to select the rule to be evicted based on the combined costs.

9. The network element according to claim 1, wherein the circuitry is configured to estimate the cost of retrieving a given rule from the data structure, and to determine the respective cost value based on the estimated cost.

10. A method, comprising:
in a network element, storing in a data structure multiple rules specifying processing of packets received from a communication network;
caching in a cache memory multiple rules comprising a subset of the rules stored in the data structure, wherein each rule that is cached in the cache memory has a respective cost value that is a function of an actual number of memory-access operations required to perform a lookup operation of the respective rule in the data structure;
receiving one or more packets from the communication network, and processing the received packets in accordance with one or more of the rules, by retrieving the rules from the cache memory when available, or by performing a lookup operation in the data structure otherwise;
selecting a rule to be evicted from the cache memory, based on one or more respective cost values of the rules currently cached; and
evicting the selected rule.

11. The method according to claim 10, and comprising retrieving a rule from the data structure, caching the retrieved rule in the cache memory, and storing a respective cost value in association with the rule cached.

12. The method according to claim 10, wherein the cost value comprises two or more cost levels corresponding to a quantized version of the actual number of memory-access operations.

13. The method according to claim 10, wherein the cost value of a given rule comprises a latency incurred in retrieving the given rule from the data structure.

14. The method according to claim 10, wherein selecting the rule to be evicted comprises selecting from the cache memory multiple candidate rules for which the respective cost values fall within a predefined range of cost values, and selecting the rule to be evicted from among the candidate rules.

15. The method according to claim 10, wherein selecting the rule to be evicted comprises selecting from the cache memory multiple candidate rules, independently of the cost values, and selecting the rule to be evicted, from among the candidate rules, based on the respective cost values of the candidate rules.

16. The method according to claim 10, wherein selecting the rule to be evicted comprises selecting the rule to be evicted randomly, with a predefined probability.

17. The method according to claim 10, and comprising assigning to the rules currently cached respective eviction attributes, wherein selecting the rule to be evicted comprises selecting from the cache memory multiple candidate rules based on the assigned eviction attributes, calculating for the candidate rules respective combined costs as a function of the respective cost values and eviction attributes, and selecting the rule to be evicted based on the combined costs.

18. The method according to claim 10, and comprising estimating the cost of retrieving a given rule from the data structure, and determining the respective cost value based on the estimated cost.

* * * * *